United States Patent
Porras et al.

(10) Patent No.: US 9,086,001 B2
(45) Date of Patent: Jul. 21, 2015

(54) METHOD TO CONTROL AND DIAGNOSE AN EXHAUST GAS HEAT EXCHANGER

(75) Inventors: Angel Fernando Porras, Dearborn, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 13/479,457

(22) Filed: May 24, 2012

(65) Prior Publication Data

US 2013/0312390 A1 Nov. 28, 2013

(51) Int. Cl.
*F01N 3/00* (2006.01)
*F01N 3/02* (2006.01)
*F01N 3/10* (2006.01)
*F01N 3/20* (2006.01)
*F01N 5/02* (2006.01)
*F01N 9/00* (2006.01)
*F02D 41/14* (2006.01)
*F02D 41/18* (2006.01)
*F02D 41/22* (2006.01)
*F02D 41/00* (2006.01)

(52) U.S. Cl.
CPC .. *F01N 5/02* (2013.01); *F01N 9/00* (2013.01); *F02D 41/1446* (2013.01); *F02D 41/18* (2013.01); *F01N 2240/02* (2013.01); *F01N 2410/03* (2013.01); *F01N 2900/1404* (2013.01); *F01P 2025/44* (2013.01); *F01P 2025/52* (2013.01); *F02D 41/22* (2013.01); *F02D 2041/0075* (2013.01); *Y02T 10/16* (2013.01); *Y02T 10/47* (2013.01)

(58) Field of Classification Search
CPC ............. F01N 3/10; F01N 5/02; Y02T 10/47; Y02T 10/16; Y02T 10/24
USPC ................... 60/278, 320; 180/65.21; 701/36; 903/903

See application file for complete search history.

(56) References Cited

U.S. PATENT DOCUMENTS

| | | | |
|---|---|---|---|
| 6,032,753 A * | 3/2000 | Yamazaki et al. | 180/65.235 |
| 6,098,602 A | 8/2000 | Martin et al. | |
| 6,182,445 B1 * | 2/2001 | Yamazaki et al. | 60/277 |
| 6,862,878 B2 * | 3/2005 | Ries-Mueller | 60/277 |
| 7,222,615 B2 | 5/2007 | Buck et al. | |
| 7,246,487 B2 | 7/2007 | Hara | |
| 2006/0112679 A1 * | 6/2006 | Kojima et al. | 60/278 |
| 2008/0115487 A1 | 5/2008 | Harada et al. | |

(Continued)

FOREIGN PATENT DOCUMENTS

JP 1132415 A 5/1989

*Primary Examiner* — Audrey K Bradley
*Assistant Examiner* — Dapinder Singh
(74) *Attorney, Agent, or Firm* — David B. Kelley; Brooks Kushman P.C.

(57) ABSTRACT

A method for controlling an engine having an exhaust gas heat exchanger includes measuring air mass flow, engine coolant temperature (ECT), exhaust gas temperature (EGT), heat exchanger coolant temperature (HECT), and engine speed; and operating a valve to selectively provide exhaust gas flow through the exhaust gas heat exchanger based on air mass flow, ECT, EGT, HECT, and engine speed. A vehicle has an engine and an exhaust heat recovery system with an exhaust gas heat exchanger and a valve configured to control exhaust gas flow. A controller for the vehicle is configured to (i) measure air mass flow, ECT, EGT, HECT, and engine speed, and (ii) operate the valve to selectively provide exhaust gas flow through the exhaust gas heat exchanger based on air mass flow, ECT, EGT, HECT, and engine speed.

17 Claims, 9 Drawing Sheets

(56) References Cited

U.S. PATENT DOCUMENTS

| | | |
|---|---|---|
| 2009/0151342 A1 | 6/2009 | Major |
| 2009/0293461 A1 | 12/2009 | Miyagawa et al. |
| 2010/0212611 A1* | 8/2010 | Yahagi .............................. 123/3 |
| 2010/0242452 A1* | 9/2010 | Kawazu et al. ................. 60/299 |
| 2011/0088378 A1 | 4/2011 | Prior et al. |
| 2011/0088672 A1 | 4/2011 | Prior et al. |
| 2013/0213600 A1 | 8/2013 | Saitoh |

* cited by examiner

METHOD TO CONTROL AND DIAGNOSE AN EXHAUST GAS HEAT EXCHANGER

TECHNICAL FIELD

Various embodiments relate to diagnosing and controlling an exhaust gas heat exchanger for an internal combustion engine.

BACKGROUND

An exhaust gas heat exchanger (EGHX) is used to recover heat from exhaust gas of an internal combustion engine to heat engine coolant. Some systems use a passive control strategy with a thermostat moving a valve or actuator to control the exhaust gas recirculation.

In a hybrid vehicle, the exhaust gas heat exchanger may also provide for earlier engine shut down. An exhaust bypass line may be provided for the exhaust gas to flow around the heat exchanger and bypass the coolant. The exhaust gas flow is directed by an EGHX valve to flow through either the EGHX or the bypass. The EGHX valve typically does not have a position sensor. Prior art systems have used passive control over the EGHX valve such that a thermostat directly moves an actuator for the EGHX valve, which may lead to coolant boiling or a time lag in the system.

SUMMARY

In an embodiment, a method for controlling an engine having an exhaust gas heat exchanger is provided. Air mass flow, engine coolant temperature (ECT), exhaust gas temperature (EGT), heat exchanger coolant temperature (HECT), and engine speed are measured. A valve is operated to selectively provide exhaust gas flow through the exhaust gas heat exchanger based on the air mass flow, ECT, EGT, HECT, and engine speed.

In another embodiment, a vehicle is provided with an engine and an exhaust heat recovery system for the engine. The exhaust heat recovery system has an exhaust gas heat exchanger and a valve configured to control exhaust gas flow. The vehicle has a controller configured to (i) measure air mass flow, engine coolant temperature (ECT), exhaust gas temperature (EGT), heat exchanger coolant temperature (HECT), and engine speed and (ii) operate the valve to selectively provide exhaust gas flow through the exhaust gas heat exchanger based on the air mass flow, ECT, EGT, HECT, and engine speed.

In yet another embodiment, a computer readable medium having stored data representing instructions executable by a controller to control a vehicle is provided with instructions for measuring air mass flow, engine coolant temperature (ECT), exhaust gas temperature (EGT), heat exchanger coolant temperature (HECT), and engine speed, and instructions for operating a valve to selectively provide exhaust gas flow through an exhaust gas heat exchanger based on exhaust gas recirculation (EGR) flow rate. The EGR flow rate compensation is based on the air mass flow, ECT, EGT, HECT, and engine speed.

Various embodiments according to the present disclosure have associated advantages. By controlling the EGHX, the engine coolant temperature may be better controlled for improved engine operation with lower friction. When the EGHX is in a hybrid vehicle, the improved engine operation may lead to the ability to pull down the engine sooner, leading to increased fuel economy. Additionally, with improved heating of the engine during restarts in a hybrid vehicle, emissions caused by a cold engine restart may be reduced. The EGHX may also provide heat to the coolant for the heating, ventilation, and air conditioning system (HVAC) of a hybrid vehicle when the engine is not running using residual heat from the engine.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
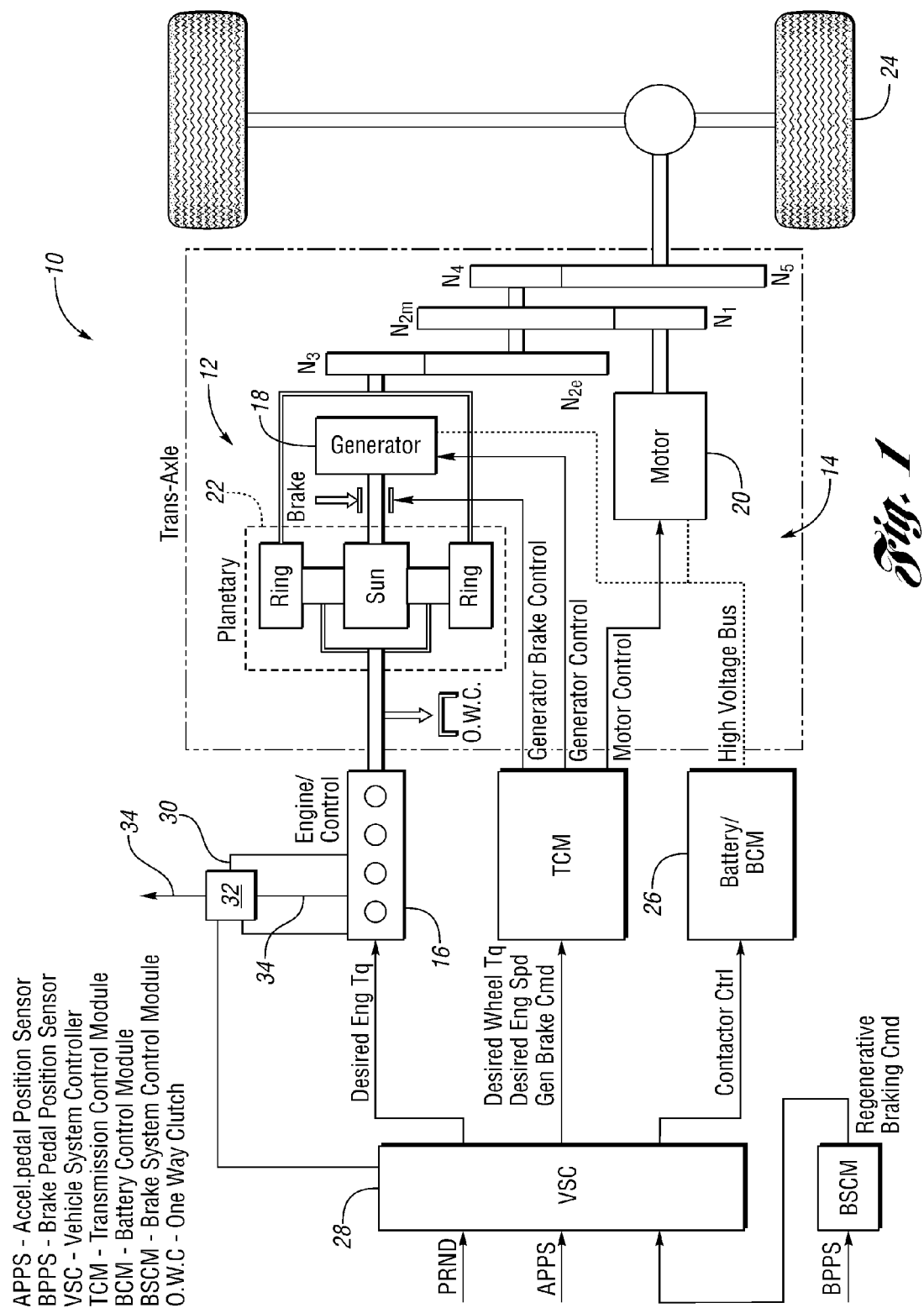
FIG. 1 is a schematic of a hybrid vehicle capable of implementing the disclosed embodiments.

In FIG. 1, an embodiment of a hybrid electric vehicle (HEV) 10 is shown schematically. In this powertrain configuration, there are two power sources 12, 14 that are connected to the driveline: 12) a combination of engine and generator subsystems using a planetary gear set to connect to each other, and 14) the electric drive system (motor, generator, and battery subsystems). The battery subsystem is an energy storage system for the generator and the motor. The power sources 12, 14 and the wheels 24 are coupled through a transmission 22 such as a planetary gearset, or others as are known in the art. FIG. 1 illustrates one possible HEV configuration. However, there are many alternatives for configuring HEVs which do not depart from the scope of the present disclosure.

A battery 26 provides electrical energy or absorbs electrical energy, depending on the operational mode of the vehicle 10. Battery 26 may also be electronically coupled to a vehicle system controller (VSC) 28 via sensors to monitor state of charge of the battery, battery health, etc. In one embodiment, battery 26 is a high voltage battery to facilitate large power extraction from, or storage into, battery 26. In some embodiments, the vehicle 10 is a plug-in hybrid electric vehicle (PHEV), and the battery 26 has a receptacle which allows the battery 26 to connect to an external power source, such as the electric grid, for recharging.

Operator inputs to vehicle 10 include a gear shift selector, an emergency brake pedal, switch, or lever, and others. The engine 16 a coolant system 30 that has an exhaust gas heat exchanger 32 which is configured to exchange heat between the exhaust gas 34 from the engine 16 and the coolant system 30 to heat the coolant.

FIG. 1 represents one type of HEV architecture. However, this is just one example and not intended to be limiting. The present disclosure may be applied to any suitable HEV, including, but not limited to PHEVs. Furthermore, the present disclosure may be applied to any conventional vehicle to heat coolant in the coolant system.

Figure 2:
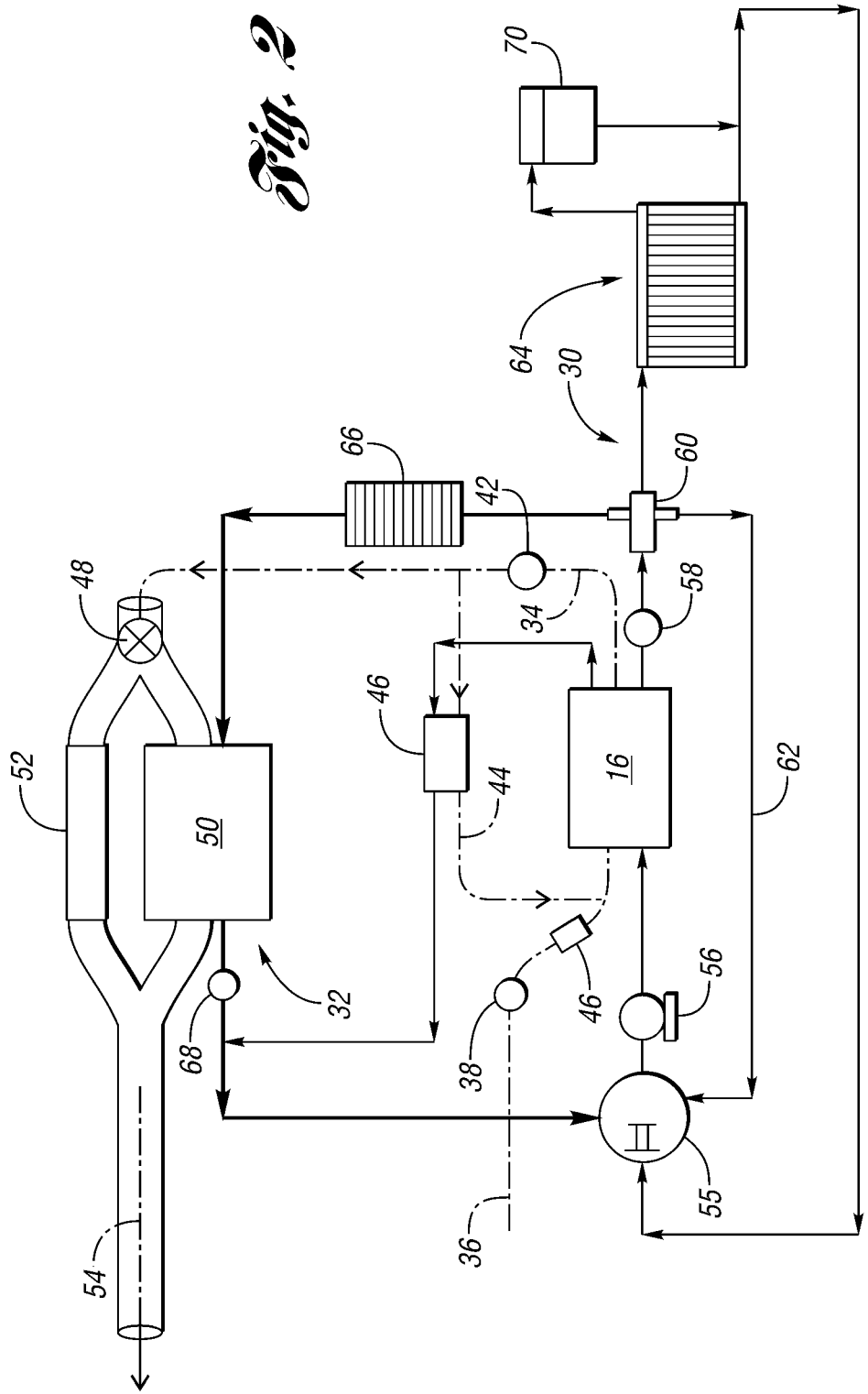
FIG. 2 is a flow diagram for a coolant circuit and an airflow circuit for an engine capable of implementing an embodiment.

FIG. 2 illustrates a schematic of a combined engine air flow and engine coolant flow diagram according to an embodiment. The coolant flow path is shown as a solid line. The air flow path is shown as a dashed line.

Referring to the air flow path first, the engine 16 receives air from the atmosphere from an intake 36. The incoming air flows through an air mass sensor 38, and then through a throttle valve that controls the flow rate of the air to the engine 16. The air then flows through the engine 16, where it combusts with fuel when the engine 16 is running. After combustion, the exhaust gas 34, heated by the combustion process, exits the engine 16. Alternatively, the air may flow through an unfueled motored engine 16, where the air may be heated by any residual heat retained by the thermal capacity of the engine block and components.

Air or exhaust gas flows from the engine 16 through the exhaust 34 and is measured by an exhaust gas temperature (EGT) sensor 42. The exhaust gas then may follow one of two flow paths. Part of the exhaust gas may flow through an exhaust gas recirculation (EGR) loop 44, which recirculates the exhaust gas back to the intake manifold of the engine 16, where it mixes with fresh incoming air before entering the engine 16. The flow of the exhaust gas through the EGR loop 44 is controlled by an EGR valve 46.

Alternatively, the exhaust gas may flow through an exhaust gas heat exchanger system (EGHX) 32, through an emissions treatment system, such as a catalytic converter, and then exit to the atmosphere. The EGHX system 32 is configured to selectively exchange heat between the exhaust gas from the engine 16 and the coolant, as discussed below. The EGHX system 32 has an inlet valve 48, which may be a two way valve. The inlet valve 48 directs the gas flow through either a heat exchanger unit 50, or through a bypass line 52 of the EGHX system 32. When the hot exhaust gas flows through the heat exchanger unit 50, it exchanges heat with coolant in the coolant system, as discussed below with respect to the coolant flow path. The gas then exits the EGHX system 32 by flowing from the heat exchanger unit 50 and/or the bypass 52 to an exhaust line 54 that feeds into an after treatment system or the like.

Referring now to the coolant flow path for the coolant system 30, coolant enters and flows through a thermostat 55, and then through a water pump 56. The coolant exits the water pump 56 and flows through coolant passages in the engine 16. The coolant may act to cool the engine 16 if the coolant temperature is lower than the temperature of the engine 16. Alternatively, the coolant may act to warm the engine 16 if the coolant temperature is higher than the temperature of the engine 16, such as may occur during an engine restart in a hybrid vehicle. No coolant flow is provided when the pump 56 is not operating.

A portion of the coolant in the system 30 may flow through the EGR valve 46 to cool the EGR valve 46. The remainder of the coolant flows out of the engine 16 where the temperature is measured by an engine coolant temperature sensor (ECT) 58. The coolant then flows to a three way splitter 60. The splitter 60 provides a passive control over the coolant flow. In other embodiments, splitter 60 may be replaced with a valve such that all coolant flow may be selectively directed through a radiator system 64.

The splitter 60 is configured to direct the coolant to at least two of three paths. Some coolant flows through a shunt line 62, where it returns to the inlet to the thermostat 55.

Coolant flows to a heat exchanger 66. The heat exchanger 66 acts as a heater for the HVAC system for the vehicle, and uses warm coolant to heat air for the passenger cabin or compartment of the vehicle. The heated air from the heat exchanger 66 is used for example in the HVAC system when a user requests a heat setting on the HVAC, for window defrost, etc. The coolant exits the heat exchanger 66 and flows to the EGHX system 32.

When the thermostat 55 is open, the coolant flows through a radiator system 64, which lowers the temperature of the coolant by passing the coolant through a heat exchanger in contact with the environment. The cooled coolant then flows from the radiator system 64 back to the thermostat 55. The flow path through the radiator may be used to lower the coolant temperature and in turn lower the engine temperature. The shunt 62 flow may vary based on whether coolant is also flowing through the radiator system 64.

The coolant enters the EGHX unit 50 of the EGHX system 32. Within the EGHX unit 50, the coolant and the exhaust gas are configured to exchange heat. If exhaust gas is flowing through the EGHX unit 50, heat may be exchanged between the two mediums such that the coolant temperature is increased by the exhaust gas temperature. After the coolant leaves the EGHX unit 50, the coolant temperature is measured by a heat exchanger coolant temperature sensor (HECT) 68, that is either incorporated into the EGHX system 32, or is positioned in a coolant line downstream of the EGHX system 32. The coolant then flows back to the inlet of the thermostat 55.

The various heat exchangers in the vehicle may be any type of heat exchanger as is known in the art, including co-flow, counter-flow, cross flow, and the like.

The coolant system 30 may have a reservoir (not shown) where coolant accumulates when it is not flowing through a cooling line or system connected to the cooling lines, and additionally the coolant system 30 may have a degas system with reservoir 70 for removing any air from the system 30.

The coolant flows through the shunt 62 at all times. The shunt 62 allows for more coolant to circulate through engine 16 than can be accommodated by the heater core 66 path alone (i.e. when the radiator 64 path is closed by the thermostat 55). The coolant flows through the radiator 64 loop when the coolant temperature is high and lowering the coolant temperature is desired. A portion of the coolant may be also be directed in part through the EGR valve 46 loop when cooling of the EGR valve 46 is required.

The coolant flows through the EGHX system 32 loop for various reasons. For example, cabin heat may be required for the HVAC and the coolant has a sufficient temperature to heat the cabin air in heat exchanger 66. The coolant temperature may be low and hot exhaust is available from the engine 16 to heat the coolant in the EGHX unit 32. Coolant flowing through the EGHX system 32 may be heated at a faster rate than using the engine 16 alone during an engine restart, for example in a hybrid vehicle after the engine has been off for a period of time.

Figure 3:
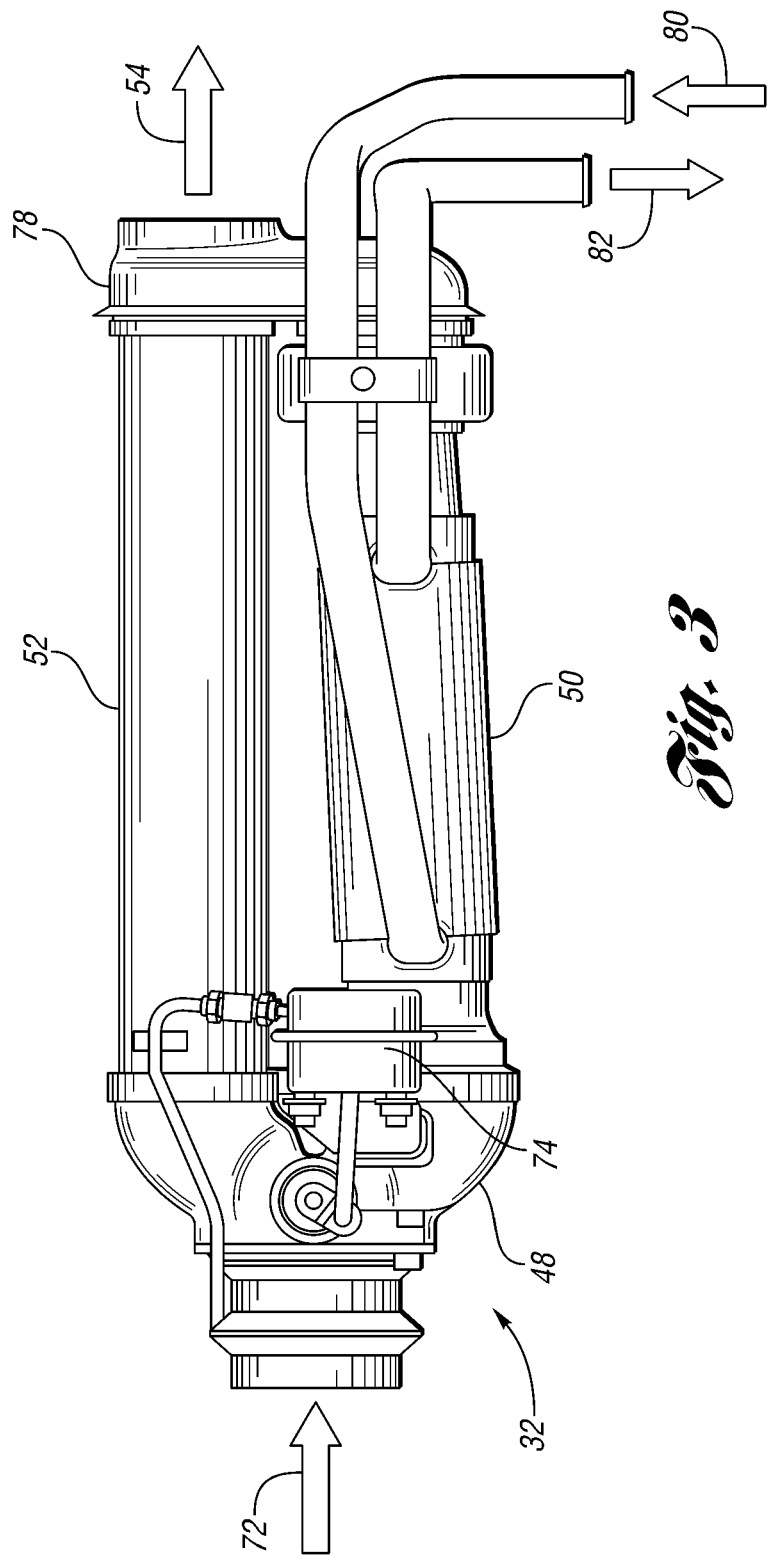
FIG. 3 is a perspective view of an exhaust gas heat exchanger system as shown in FIGS. 1 and 2.

FIG. 3 illustrates a perspective view of the EGHX system 32 according to an embodiment of the disclosure. Exhaust gases from the engine 16 enter the system 32 at inlet 72, and then flow through valve 48. The valve 48 may be a two way valve and is controlled using an actuator 74. The actuator 74 may be a solenoid in communication with the controller 28. The valve 48 directs the exhaust through either an exhaust gas bypass line or tube 52 or through a heat exchanger 50. The exhaust flow from the bypass and/or the heat exchanger 50 is consolidated back into a single flow through a junction 78, and the exhaust then exits the system 32 to exhaust line 54.

The coolant enters the EGHX system 32 at inlet 80 from the splitter 60 (see FIG. 2). The coolant flows through the heat exchanger 50 where energy and heat may be selectively transferred between the exhaust gas from the engine 16 and the coolant, thereby heating the coolant using the hot exhaust gas from the engine 16. The coolant may be heated by any exhaust gas flowing through the heat exchanger 50 or from residual heat in the heat exchanger fins, as directed by valve 48. If the exhaust gas is flowing through the bypass 52, as directed by valve 48, the coolant temperature will be generally unaffected by the exhaust gas temperature since there will be no exhaust gas flowing in the heat exchanger 50 to heat the coolant.

The coolant exits the heat exchanger at 82 and the temperature of the coolant is then measured using the HECT 68 downstream of the system 32. The heat exchanger 50 is shown as a co-flow heat exchanger, although any configuration of heat exchanger may be used.

Figure 4:
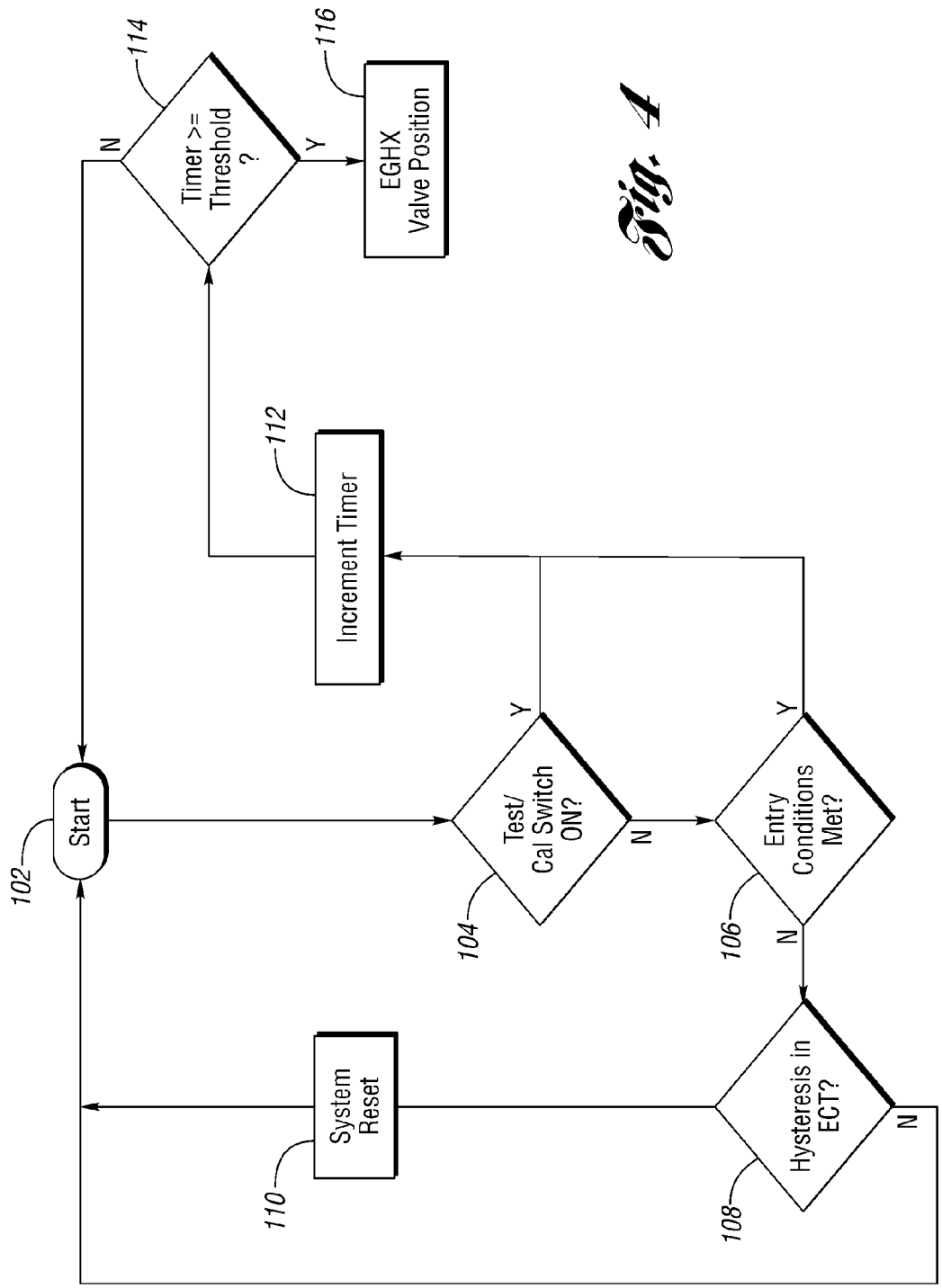
FIG. 4 is a flow chart for controlling an exhaust gas heat exchanger system according to an embodiment.

FIG. 4 is a schematic of a flow chart 100 for controlling the EGHX system 32 in vehicles such as HEV 10. The algorithm 100 starts at 102 and proceeds to 104, where it determines if a manual override to force the heat exchanger 50 configuration in the EGHX system 32 on or off is present. If there is no manual override at 104, the algorithm proceeds to 106. At 106, the controller 28 determines if entry conditions are met. Entry conditions may include: the HECT being less than a threshold, the ECT being less than a threshold, exhaust gas temperature being above a threshold, intake air mass for the engine 16 being below a threshold, and engine 16 speed being above a threshold. These entry conditions should be viewed as non-limiting and the algorithm may include some or all of the entry conditions described. In one embodiment, the HECT is less than 230 F, the ECT is less than 180 F, the exhaust temperature is above 250 F, the air mass intake is below a threshold to prevent too high of a heat transfer rate, and the engine 16 speed is at least 500 rpm. Of course, other values for various entry conditions are also contemplated.

If the entry conditions at 106 are not met, the system checks for hysteresis for one or more of the entry condition variables, such as ECT, at 108, that would cause the heat exchanger 50 configuration to toggle on and off. If there is hysteresis at 108, the system may be reset at 110. If there is no hysteresis at 108, the algorithm 100 proceeds to the start at 102.

If the entry conditions at 106 are met, or if the manual override is on at 104, the algorithm 100 goes to a valve actuator timer at 112, which sets a flag. The flag is set due to a lag between the command to open the valve 48 and when the valve physically opens. This delay may be five seconds, or another length of time, for example. The algorithm 100 then checks the time since the flag has been set at 114. When the time since the flag has been set at 114 reaches a designated value, such as the time lag to open valve 48, the system proceeds to 116 and enters a heat recovery mode for the EGHX system 32, which may also act as an operating signal for other systems. For example, the signal for heat recovery mode at 116 feeds into an EGR flow prediction algorithm at 124 as seen in FIG. 5 where the EGHX valve position is determined.

Figure 5:
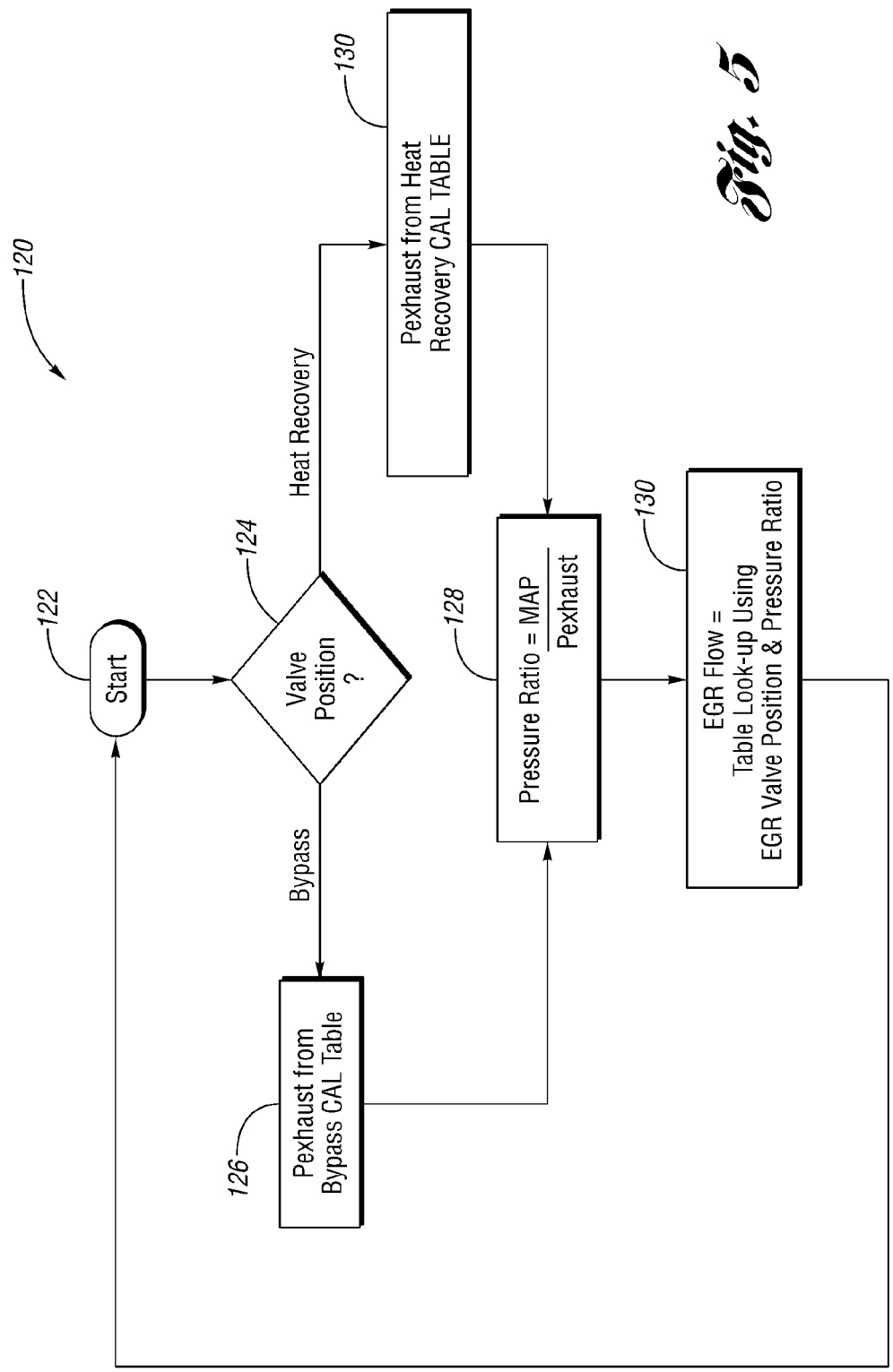
FIG. 5 is a flow chart for predicting the exhaust gas recirculation flow based on EGR and EGHX valve positions according to an embodiment.

FIG. 5 illustrates an algorithm 120 to predict exhaust gas recirculation flow rate based on EGR valve 46 and EGHX valve 48 positions. Since the back pressure of the exhaust is variable due to the addition of the EGHX system 32, a correlation is needed to determine and compensate the EGR flow to control the engine 16 system. The algorithm 120 starts at 122 and proceeds to 124, where it determines what position the EGHX valve 48 is in. If the EGHX valve 48 is in a bypass configuration, the algorithm 120 proceeds to 126, where the exhaust pressure is determined using a calibration or look up table, that provides the upstream exhaust pressure as a function of air mass at the intake 36 based on the EGHX valve 48 being in a bypass configuration. The upstream, or exhaust manifold pressure is not measured and so is inferred from the air mass data and the tables. The exhaust pressure is then used as an input to 128.

If the EGHX valve 48 is in a heat recovery configuration using EGHX 50, the algorithm proceeds to 130, where the exhaust pressure is determined from a calibration or look up table that provides the upstream exhaust pressure as a second function of air mass at the intake 36 based on the EGHX valve 48 being in a heat recovery configuration. The upstream, or exhaust manifold pressure is not measured and so is inferred from the air mass data and the tables. The exhaust pressure is then used as an input to 128.

At 128, a pressure ratio is calculated as the ratio of the intake manifold pressure to the exhaust pressure from 126 or 128. The intake manifold pressure may be measured or may be inferred. The pressure ratio calculated at 128 is used as an input to 130, where the EGR flow rate is determined using a look up or calibration table based on the EGR valve 46 position and the pressure ratio from 128 to provide a value for EGR flow.

Figure 6:
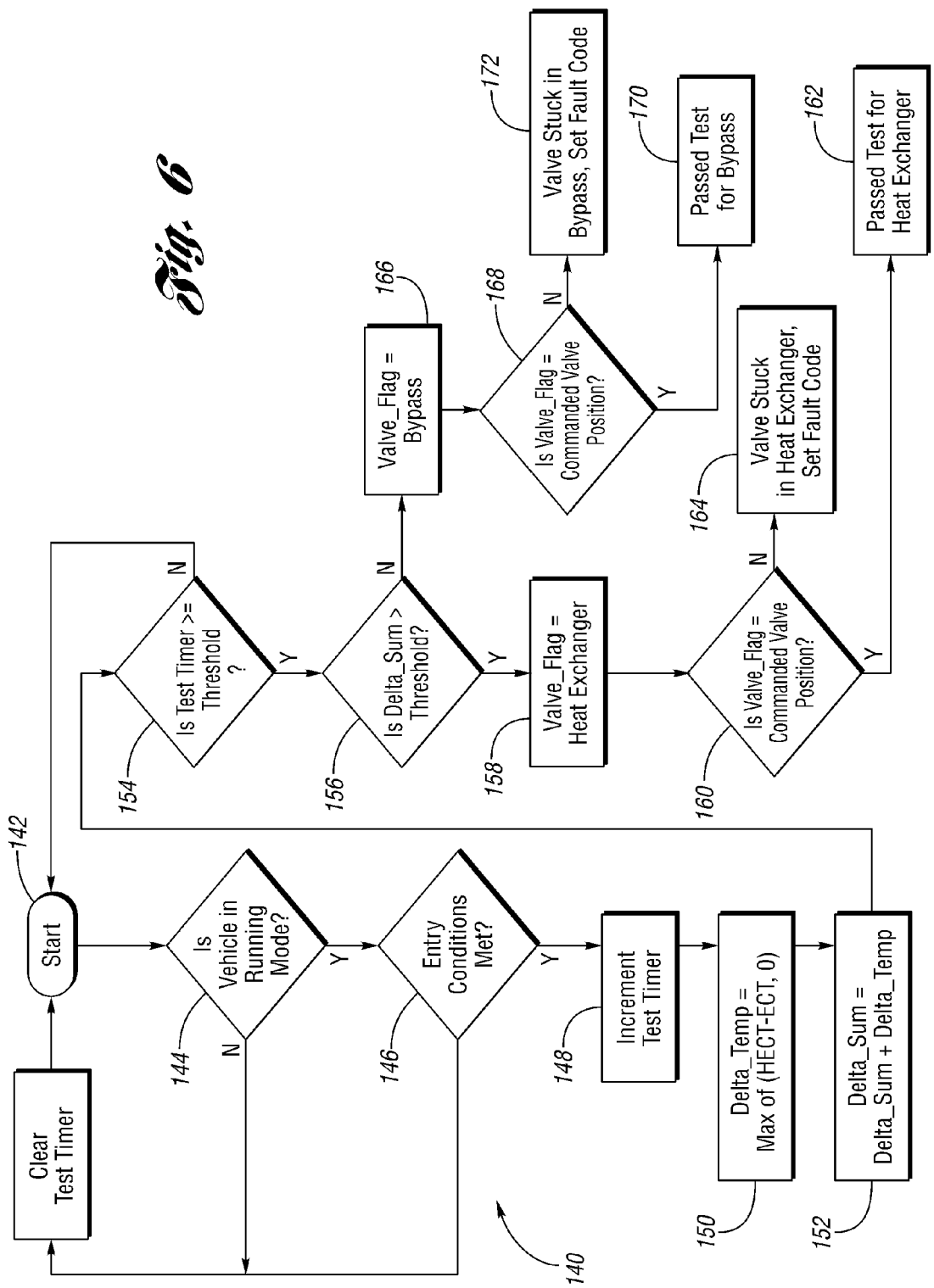
FIG. 6 is a flow chart for diagnosing an exhaust gas heat recovery system according to an embodiment.

A diagnostic for an EGHX system 32 is illustrated in FIG. 6 at 140. The diagnostic 140 starts at 142, and then determines if the vehicle is in a running mode at 144. The vehicle being in a running mode may include a gear lever being in a drive position, and the brake not engaged, for example. If the vehicle is in a running mode at 144, the diagnostic 140 then determines if various entry condition are met at 146. Entry conditions may include low noise factors, such as a heater core being in an off configuration, the engine operating in a steady state configuration over a designated time, and that the valve 48 position has not been commanded to change over another designated time period. If the entry conditions are met, the diagnostic increments a test time at 148 for a test timer.

The diagnostic determines the change in temperature, $\Delta T$, at 150 to be:

$$\Delta T_i = \max \begin{cases} HECT - ECT \\ 0, \end{cases}$$

and uses the change in temperature to calculate a running sum of the change in temperature at 152 as:

$$\Delta Sum_{i+1} = \Delta Sum_i + \Delta T_i.$$

The diagnostic 140 checks to see if the running sum has been calculated for a designated time period at 154 by checking the test timer. If the test and running sum have not run for the designated time, for example, sixty seconds, the diagnostic 140 loops back to the start 142 and may continue to calculate the running sum until the designated time has been reached or the entry conditions are no longer met. If the test timer is at or past the designated time, the diagnostic 140 proceeds to 156 and compares $\Delta Sum$ to a threshold.

If ΔSum is greater than the threshold, a valve 48 diagnostic flag is set to heat exchanger configuration at 158, and the valve 48 diagnostic flag is then checked against the commanded valve position at 160. If the valve 48 diagnostic flag is correct, such that the flag is for a heat exchanger configuration, and the valve 48 commanded position is also for the heat exchanger configuration, the diagnostic 140 passes at 162. If the valve 48 diagnostic flag is false, such that the flag is set for a heat exchanger configuration, and the valve 48 commanded position is for a bypass configuration, the diagnostic sets a fault code at 164.

Referring back to block 156, if ΔSum is less than the threshold, a valve 48 diagnostic flag is set to a bypass configuration at 166, and the valve 48 diagnostic flag is then checked against the commanded valve position at 168. If the valve diagnostic flag is correct, such that the flag is for a bypass configuration, and the valve commanded position is also for a bypass configuration, the diagnostic 140 passes at 170. If the valve 48 diagnostic flag is false, such that the flag is for a bypass configuration, and the valve 48 commanded position is for a heat exchanger configuration, the diagnostic 140 sets a fault code at 172.

The diagnostic 140 may be operated each vehicle key cycle, with one run for each valve position or configuration. Of course, it is also contemplated that the diagnostic be run more often in each vehicle key cycle. In other embodiments, the diagnostic may not run during a vehicle key cycle if the engine is never pulled up or operated during the key cycle.

Figure 7:
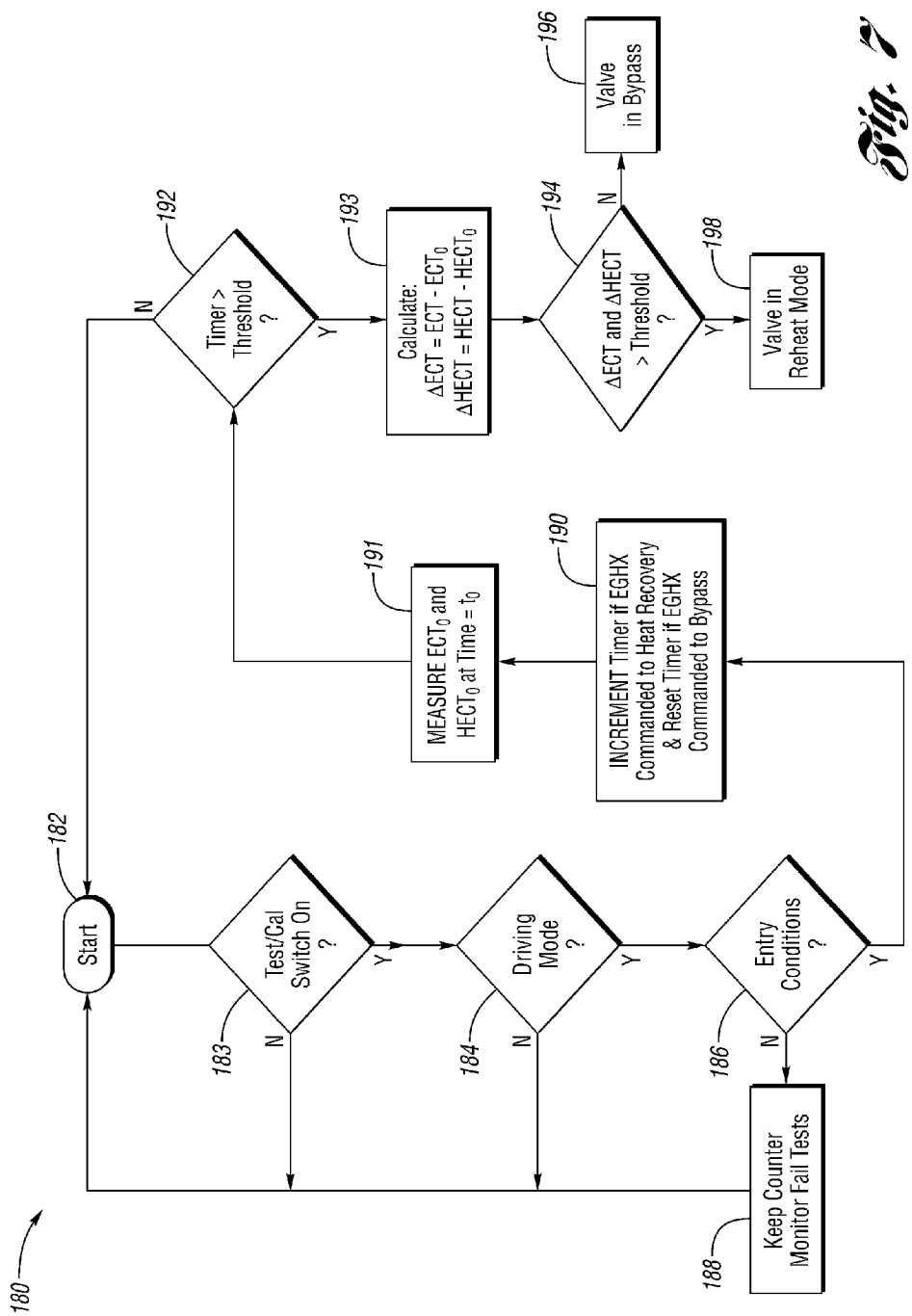
FIG. 7 is a flow chart for diagnosing an exhaust gas heat recovery system according to another embodiment.

Another diagnostic for an EGHX system 32 is illustrated in FIG. 7 at 180. The diagnostic 180 starts at 182, and proceeds to 183, where it determines if a manual override to force the heat exchanger 50 configuration in the EGHX system 32 on or off is present. If there is no manual override at 183, the algorithm proceeds to determine if the vehicle is in a running or driving mode at 184. The vehicle being in a driving mode may include a gear lever being in a drive position, and the brake not engaged, for example. If the vehicle is in a running mode at 184, the diagnostic 180 then determines if various entry condition are met at 186. Entry conditions may include low noise factors, such as a heater core being in an off configuration, the ECT 58 being less than a calibration temperature, such as 180 F, the engine 16 operating in a steady state configuration over a designated time, and valve 48 position begin unchanged for a designated time period. If the entry conditions are not met, the diagnostic 180 may increment a counter to monitor for a lack of test entries at 188. If the entry conditions are met at 186, the diagnostic 180 increments a timer at 190 if the EGHX valve 48 is commanded to a heat recovery mode and resets the timer if the EGHX valve 48 is commanded to a bypass mode. The controller 40 conducts a data capture at 191 where it measures at least one of the ECT 58 and the HECT 68 at an initial time, $t_o$.

After the timer has reached or passed a threshold time value at 192, the diagnostic 180 proceeds to calculate a change in HECT ($\Delta HECT=(T_1-T_0)_{HECT}$), a change in ECT ($\Delta ECT=(T_1-T_0)_{ECT}$), or both the change in HECT and the change in ECT at 193 using the data captured in 191 and data captured after the timer has crossed its threshold time. The ΔECT and ΔHECT are compared against a threshold value at 194. If the ΔECT and ΔHECT are less than the threshold value, the valve 48 is in a bypass configuration at 196, and this may be checked against the commanded valve 48 position to determine if the diagnostic 180 results in a pass or a fault code for the EGHX system 32. If the ΔECT and ΔHECT are greater than the threshold value, the valve 48 is in a heat recovery configuration at 198, and this may be checked against the commanded valve 48 position to determine if the diagnostic 180 results in a pass or a fault code for the EGHX system 32.

The diagnostic 180 may be run each vehicle key cycle, with one run for each valve 48 configuration. Of course, it is also contemplated that the diagnostic be run more often in each vehicle key cycle. In other embodiments, the diagnostic may not run during a vehicle key cycle if the engine is never pulled up and/or operated during the key cycle.

The diagnostic 180 may have a minimum flow rate required for heat recovery mode in the EGHX system 32. The thresholds in step 194 may vary based on engine speed, engine load, and/or ambient temperature.

Figure 8:
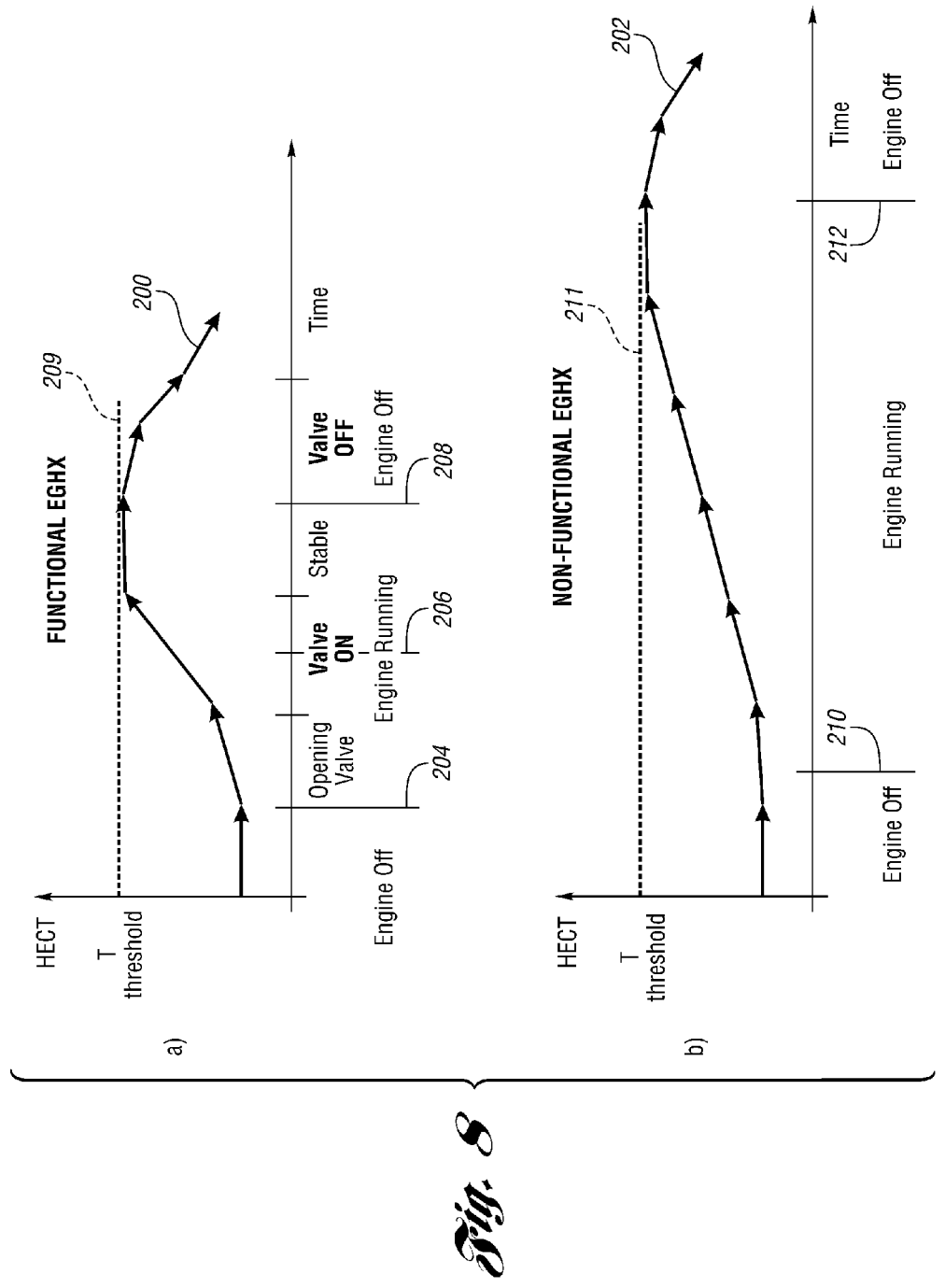
FIGS. 8a and 8b are plots depicting engine coolant temperature profiles based on the EGHX valve position.

FIG. 8 illustrates two engine coolant warm up profiles as measured by the HECT sensor 68 with the EGHX valve 48 switched to a heat recovery position (FIG. 8*a*), and with the EGHX valve 48 left in a bypass configuration (FIG. 8*b*). In FIG. 8*a*, the engine 16 is initially off, and then begins to operate at 204. In one embodiment, the engine 16 pull up request is caused by a need to increase the coolant temperature. After the engine 16 begins to operate at 204, the valve 48 is opened at 206 to a heat recovery configuration. The HECT 200 rises rapidly as heat is exchanged between the engine 16 exhaust and the coolant in the EGHX 50. The engine 16 is shut down at 208 when the coolant temperature reaches a threshold temperature 209. The valve 48 is placed back into a bypass configuration, and the HECT 200 drops. Although the valve 48 is shown as changing position with the change in the engine 16 state, it is not necessarily tied to the engine 16 and may be operated independently, to use residual heat in the EGHX 50 for example.

In FIG. 8*b*, the engine 16 is initially off, and then begins to operate at 210. The valve 48 remains in a bypass mode for FIG. 8*b*. The ECT 202 slowly rises as the engine 16 heats up. The coolant temperature decreases when the engine 16 is shut down at 212. The warm up time for the coolant to reach a threshold temperature 211 as shown in FIG. 8*b* with the EGHX system 32 in a bypass configuration is much longer than the warm up time in FIG. 8*a* with the EGHX system 32 in a heat recovery mode. The engine 16 therefore operates for a longer time period in the example shown in FIG. 8*b* before the threshold temperature is reached and a pull down request can be made, which in turn reduces fuel economy for the vehicle.

Figure 9:
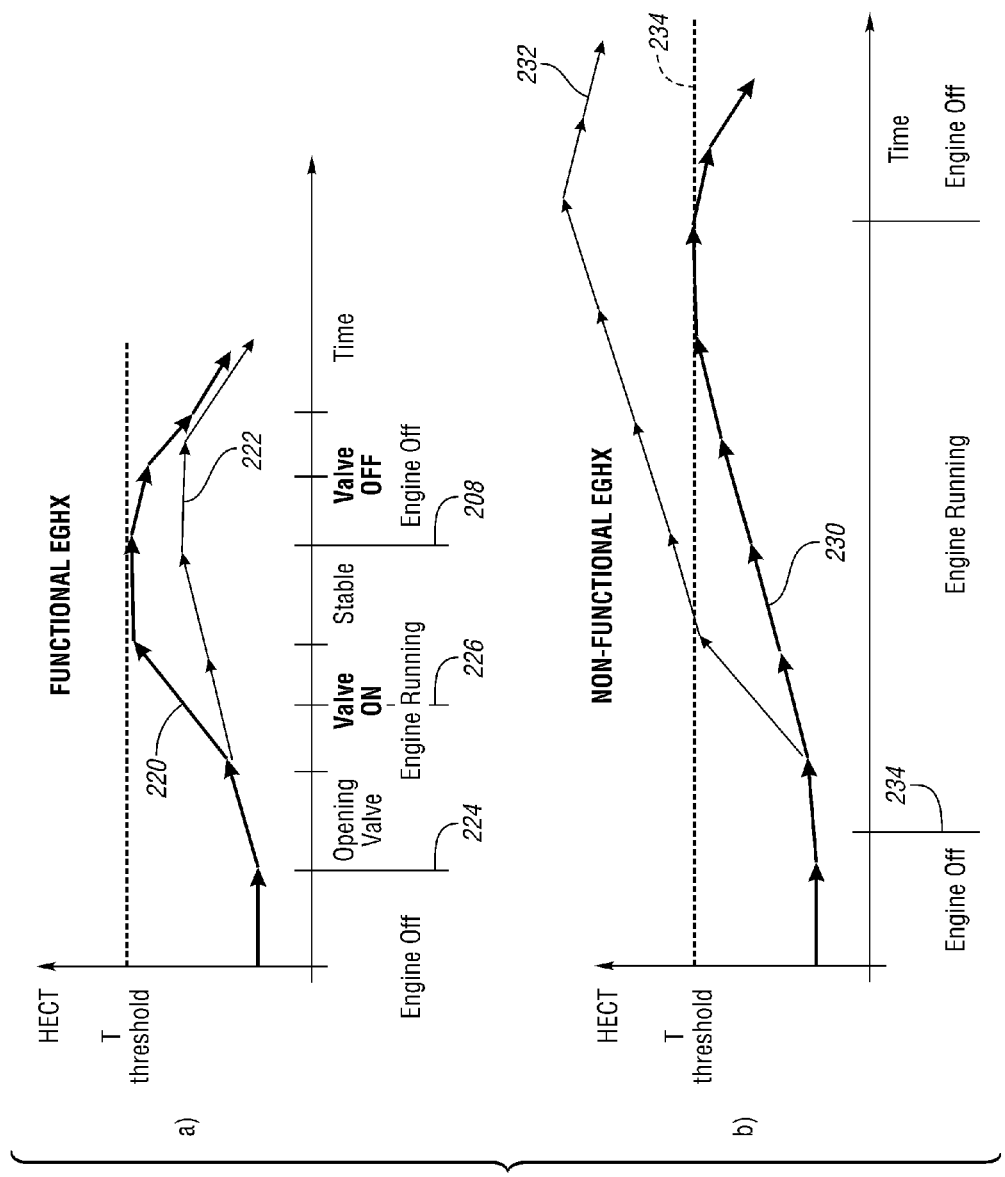
FIGS. 9a and 9b are plots depicting an engine coolant temperature profile for flow through an exhaust gas heat exchanger using the diagnostic shown in FIG. 7.

FIG. 9 illustrates an example of the diagnostic 180 shown in FIG. 7, with the HECT temperature plotted against time. FIG. 9*a* illustrates the EGHX valve 48 in heat recovery and FIG. 9*b* illustrates the EGHX valve 48 in bypass mode. The diagnostic 180 may be performed to compare changes in slopes of the coolant temperatures, as the EGHX valve 48 going into heat recovery mode causes a more rapid rise in HECT and/or ECT.

Referring first to FIG. 9*a*, the commanded or expected HECT is shown by line 220, and the measured HECT is shown by line 222. The engine 16 is initially off, and then begins to operate at 224 due to a request for an increased coolant temperature for example. After the engine 16 begins to operate at 224, the valve 48 is opened at 226 to a heat recovery position. The HECT is expected to rise rapidly, as shown by line 220, as heat is expected to be exchanged between the engine 16 exhaust and the coolant in the EGHX system 32. The actual HECT 222 does not rapidly rise, and does not follow the expected HECT 220. The diagnostic 180 determines that there is a fault in the EGHX system 32 since the valve 48 behaves as if it is in a bypass mode and not in a heat recovery mode as commanded.

Referring to FIG. 9*b*, the commanded or expected HECT is shown by line 230, and the actual measured HECT is shown by line 232. The engine 16 is initially off, and then begins to operate at 234. The valve 48 is commanded to the bypass configuration, and the temperature of the coolant is expected to slowly rise, as illustrated by line 230. The measured HECT 230 rises rapidly and continues to climb past the target coolant temperature at 234. The diagnostic 180 determines that there is a fault in the EGHX system 32 since the valve 48 behaves as if it is in a heat recovery mode and not in a bypass mode as commanded.

Various embodiments have associated advantages including improved control over the EGHX system 32, with the engine coolant temperature better controlled for improved engine operation with lower friction. When the EGHX system 32 is in a hybrid vehicle, the improved engine operation may lead to the ability to pull down the engine sooner, leading to increased fuel economy. Additionally, with improved heating of the engine during restarts in a hybrid vehicle, emissions caused by a cold engine restart may be reduced. Use of the EGHX system 32 may also provide heat for the heating, ventilation, and air conditioning system (HVAC) of a hybrid vehicle when the engine is not running using residual heat in the engine block and system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A method for controlling an engine having an exhaust gas heat exchanger (EGHX) providing an exhaust gas flow path to atmosphere, comprising: measuring intake air mass flow, engine coolant temperature (ECT), exhaust gas temperature (EGT), heat exchanger coolant temperature (HECT), and engine speed; and operating a valve to selectively provide exhaust gas flow through the EGHX to atmosphere based on the intake air mass flow, ECT, EGT, HECT, and engine speed.

2. The method of claim 1 wherein the valve directs exhaust gas flow through one of the EGHX and a bypass around the EGHX to atmosphere, the EGHX configured to transfer heat between coolant and an engine exhaust manifold.

3. The method of claim 1 further comprising predicting EGR flow rate using a position of the valve for the EGHX, a pressure ratio between exhaust pressure and intake manifold pressure, and an EGR valve position.

4. The method of claim 1 wherein operating the valve comprises commanding the valve to a position providing exhaust gas flow to the EGHX such that exhaust gas heats coolant within the EGHX when an entry condition is met.

5. The method of claim 4 further comprising measuring an ECT to be less than an ECT threshold, measuring an EGT to be greater than an EGT threshold, and measuring an HECT to be less than an HECT threshold to provide the entry condition.

6. A vehicle comprising:
an engine;
an engine exhaust having first exhaust gas flow path to atmosphere through a primary exhaust line containing an exhaust heat recovery system and a second exhaust gas flow path to an engine intake through an exhaust gas recirculation (EGR) system, the exhaust heat recovery system having an exhaust gas heat exchanger, a bypass channel around the heat exchanger, and a valve configured to selectively control exhaust gas flow through the heat exchanger and the bypass channel; and
a controller configured to (i) measure intake air mass flow, engine coolant temperature (ECT), exhaust gas temperature (EGT), heat exchanger coolant temperature (HECT), and engine speed, and (ii) operate the valve to selectively provide exhaust gas flow through the exhaust gas heat exchanger based on the intake air mass flow, ECT, EGT, HECT, and engine speed.

7. The vehicle of claim 6 wherein the valve is configured to direct exhaust gas flow through the exhaust gas heat exchanger, the heat exchanger configured to transfer heat between coolant and an engine exhaust manifold.

8. The vehicle of claim 6 further comprising an EGR valve; wherein the controller is configured to predict EGR flow rate using the exhaust gas heat exchanger valve position, a pressure ratio between exhaust pressure and intake manifold pressure, and the EGR valve position due to a variable exhaust back pressure caused by and upstream of the valve in the exhaust heat recovery system.

9. The vehicle of claim 6 further comprising:
an electric machine configured to propel the vehicle; and
a traction battery in electrical communication with the electric machine.

10. The vehicle of claim 6 wherein the valve is a two way valve positioned upstream of the exhaust gas heat exchanger and the bypass channel.

11. The vehicle of claim 6 further comprising a coolant system, the coolant system containing a pump providing flow to engine coolant passages and to a splitter selectively directing coolant to return to an inlet of the pump via a first coolant path through a shunt, a second coolant path through a radiator system, and a third coolant path through the exhaust gas heat exchanger.

12. The vehicle of claim 11 wherein the third cooling path also includes an HVAC heat exchanger.

13. The vehicle of claim 11 wherein the controller is further configured to operate the valve to selectively provide exhaust gas flow through the exhaust gas heat exchanger based on the intake air mass flow, ECT, EGT, HECT, and engine speed.

14. The vehicle of claim 6 wherein the controller is configured to operate the valve by commanding the valve to a position providing exhaust gas flow to the heat exchanger such that exhaust gas heats coolant within the heat exchanger when an entry condition is met.

15. The vehicle of claim 14 further comprising an EGT temperature sensor positioned downstream of the engine;
wherein the controller is configured to measure EGT to be less than an EGT threshold to provide the entry condition.

16. The vehicle of claim 14 further comprising an ECT temperature sensor positioned downstream of the engine;

wherein the controller is configured to measure ECT to be less than an ECT threshold to provide the entry condition.

17. The vehicle of claim 16 further comprising an HECT temperature sensor positioned downstream of the heat exchanger;
   wherein the controller is configured to measure HECT to be less than an HECT threshold to provide the entry condition.

\* \* \* \* \*